United States Patent [19]

Scott et al.

[11] Patent Number: 5,519,275
[45] Date of Patent: May 21, 1996

[54] ELECTRIC MACHINE WITH A TRANSFORMER HAVING A ROTATING COMPONENT

[75] Inventors: Harold C. Scott; Gary W. Johnson, both of Alamogordo, N.M.

[73] Assignee: Coleman Powermate, Inc., Kearney, Nebr.

[21] Appl. No.: 210,016

[22] Filed: Mar. 18, 1994

[51] Int. Cl.[6] ............................................. H02K 16/00
[52] U.S. Cl. .................. 310/112; 310/68 D; 310/74; 310/176; 310/184; 310/198; 310/254; 310/261; 310/113; 318/807; 336/120
[58] Field of Search .................. 310/112, 74, 113, 310/688, 114, 176, 198, 254, 184, 261, 68 D; 336/120; 318/807

[56] References Cited

U.S. PATENT DOCUMENTS

| | | | |
|---|---|---|---|
| 3,046,471 | 7/1962 | Williams | 336/120 |
| 3,317,874 | 5/1967 | Honsinger | 336/120 |
| 4,517,471 | 5/1988 | Sachs | 336/120 |
| 5,065,060 | 11/1991 | Takahashi et al. | 310/113 |
| 5,079,463 | 1/1992 | Matsuyama | 310/81 |
| 5,097,165 | 3/1992 | Mashino et al. | 310/112 |

OTHER PUBLICATIONS

NASA Tech Brief; Apr. 1991; B91–10133/NPO–17169; *Improved Rotary Transformer for Shaft–Position Indicator.*
NASA Tech Brief; Fall 1980; B80–10300/NPO–14861; *28–Channel Rotary Transformer.*
NASA Tech Brief; Spring 1981; B81–10008/GSC–12595; *Rotary Transformer Seals Power in.*
NASA Tech Brief; Spring/Summer 82; B82–10108/NPO–15457; *Split Coil Forms for Rotary Transformers.*
NASA Tech Brief; Spring 85; B85–10013/NPO–16276; *Resistive Fine Tuning of Resonant Circuit.*
NASA Tech Brief; Summer 85; B85–10156/NPO–16270; *Rotary Power Transformer and Inverter Circuit.*
NASA Tech Brief; Feb. 87; B87–10082/MFS–19810; *Noncontacting Measurement of Shaft Angle.*
NASA Tech Brief; May 88; B88–10265/NPO–17120; *Equations for Rotary Transformers.*

Primary Examiner—R. Skudy
Attorney, Agent, or Firm—Michael A. Lechter

[57] ABSTRACT

An electric machine according to various aspects of the invention includes a transformer having a rotating component for transmitting power from a stationary portion of the machine to a rotating portion of the machine, or vice versa. Both the rotating component and a stationary component of the transformer includes a winding, wherein the windings are disposed to be magnetically coupled. Current provided to the winding of the stationary component generates a magnetic field, which induces current in the winding of the rotating component.

30 Claims, 11 Drawing Sheets

ELECTRIC MACHINE WITH A TRANSFORMER HAVING A ROTATING COMPONENT

BACKGROUND OF THE INVENTION

The invention relates to electrical generators and motors, and more particularly, to transformers used in portable electrical generators and motors.

A reliable power source is required in innumerable situations where conventional power supplies are inaccessible. This is commonly the case with respect to recreational vehicles and other outdoor activities. For example, a wide range of electrical equipment and appliances, such as light sources, power tools, and vehicles, are commonly used in places where access to conventional electrical outlets is inconvenient or impossible. Running electrical extension cords from an outlet within a building to the roof of the building or outside to an electrical tool consumes valuable time.

There are two practical options for supplying power at a remote location: a battery or a portable generator. Batteries have a finite lifetime, and are prone to failure at the worst possible times and places. In particular, failure of a vehicle, boat, or aircraft battery may leave the user stranded in a frustrating or even dangerous situation. Consequently, portable generators are often more appropriate.

Portable generators commonly comprise a conventional diesel or gasoline powered engine which turns a crankshaft. The crankshaft transfers power to a conventional generator, such as a rotor for a conventional induction generator. The rotor generates a magnetic field, which rotates concomitantly with the rotation of the rotor and crankshaft. As the magnetic field intercepts the windings on the stator, electrical current begins to flow. That current is used to supply power to the equipment or appliance. Alternatively, a magnetic field may be created by current flowing through the stator winding, and as the rotor rotates through the magnetic field, current is generated in the rotor windings, which may be used to supply power to a tool or appliance.

Generators commonly include brushes and slip rings to transfer electrical current to and from the rotating part of the generator. Slip rings are typically circular conductors connected to the respective terminals of the rotating windings. Brushes represent stationary electrical terminals constantly in contact with the slip rings as they rotate, so that a conductive path is established between the rotating rings and the brushes and hence between the generator terminals and the rotating windings. Although slip rings and brushes provide effective electrical transfer, they are subject to wear and failure. As a result, generators equipped with brushes are typically unsuitable for remote or emergency uses.

Brushless designs are well known in the field of generator and motor design. Most brushless designs, however, add significant weight and length to the generator. For example, one common design requires a secondary alternator having a rotor which is also rotated by the crankshaft. In the secondary alternator, current flowing in the stator winding generates a magnetic field through which windings on the secondary alternator's rotor pass. Current induced in the secondary alternator's rotor winding supplies current to the field winding on the rotor of the primary generator, which then rotates to generate the main current in the stator winding. Because the secondary alternator's winding is rotating with the primary generator's field winding, the need for brushes and slip rings is eliminated. The secondary alternator, however, adds substantial weight and length to the generator. As a result, the generator is unwieldy and bulky, reducing its portability. For some applications requiring compact generators, such as recreational and emergency vehicles, a large generator may consume space that is preferably devoted to other equipment.

Smaller, more portable generators, on the other hand, are unable to supply sufficient power over a reasonable duration of time. Such relatively small portable generators commonly provide relatively low power, unsuitable for supplying multiple lights, appliances, or equipment that draw significant power.

SUMMARY OF THE INVENTION

The present invention provides a particularly advantageous brushless mechanism for effecting an electrical coupling between rotating parts, particularly suited for generators. Power is transmitted between a rotating portion of the machine and a stationary portion through a transformer having a rotating section and a stationary section, each section having a winding. The rotating portion of the machine is connected to the rotating winding, while the stationary portion is connected to the stationary winding. Current flowing in one winding induces current flow in the other winding. As a result, power is transmitted between the rotating and the stationary portions without brushes and slip rings.

BRIEF DESCRIPTION OF THE DRAWING

The present invention will hereinafter be described in conjunction with the appended figures, wherein like numerals denote like elements, and.

DETAILED DESCRIPTION OF THE PREFERRED EMBODIMENT

Figure 1:
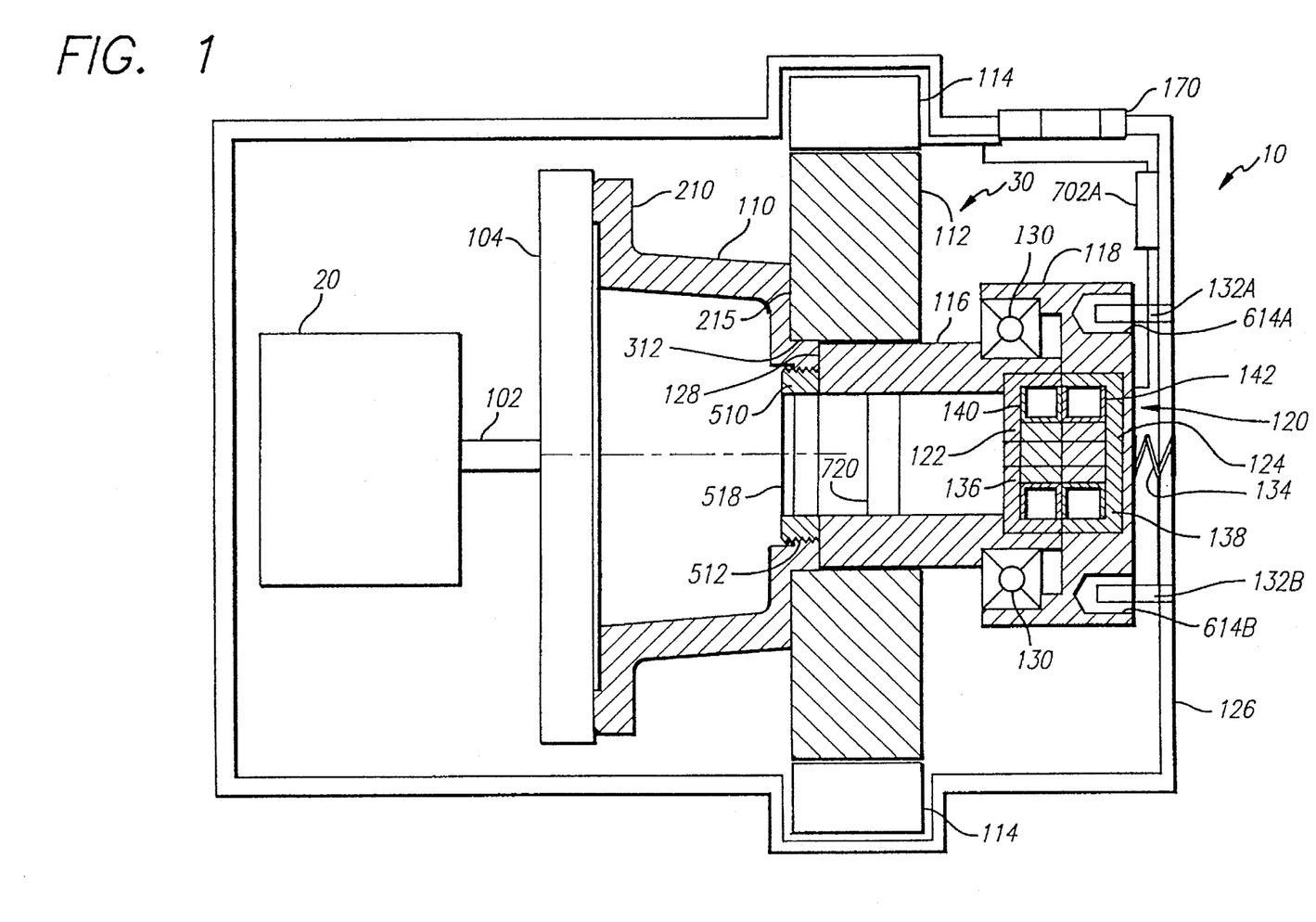
FIG. 1 is a sectional view of a power supply according to various aspects of the present invention.
Figure 2A:
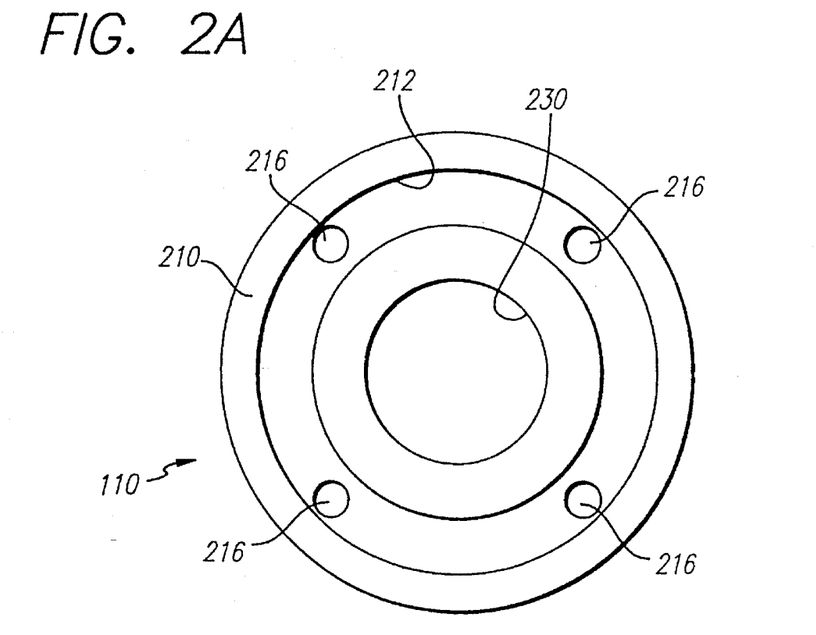
FIGS. 2A–2D are front, rear, and two sectional views of the rotor mounting adapter in FIG. 1.
Figure 2B:
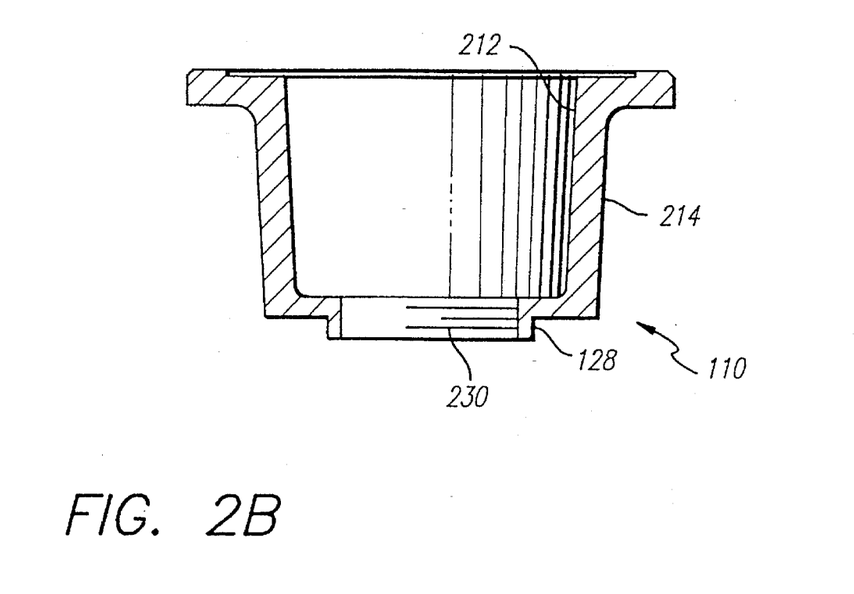
Figure 2C:
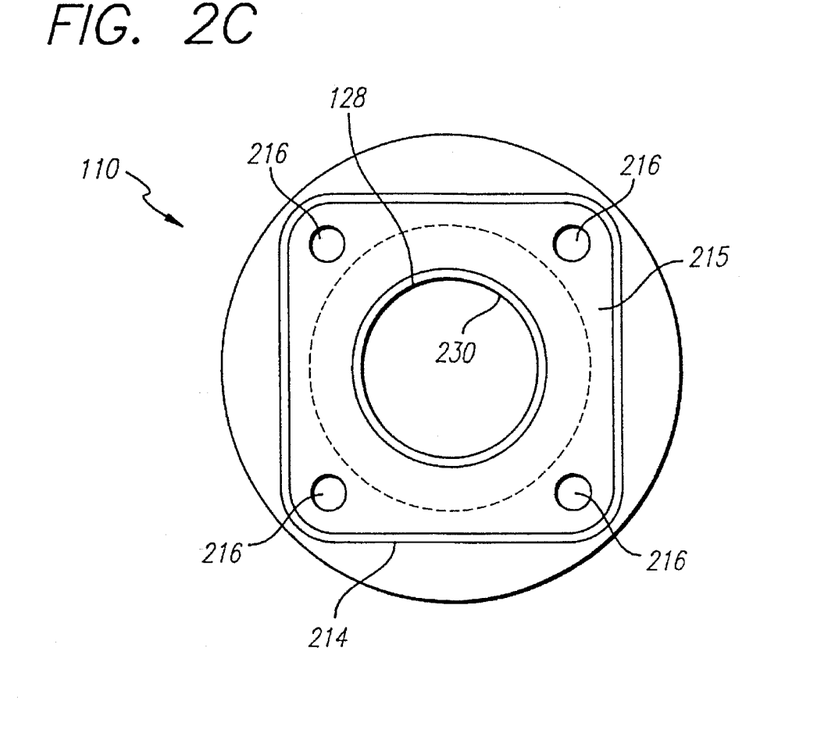
Figure 2D:
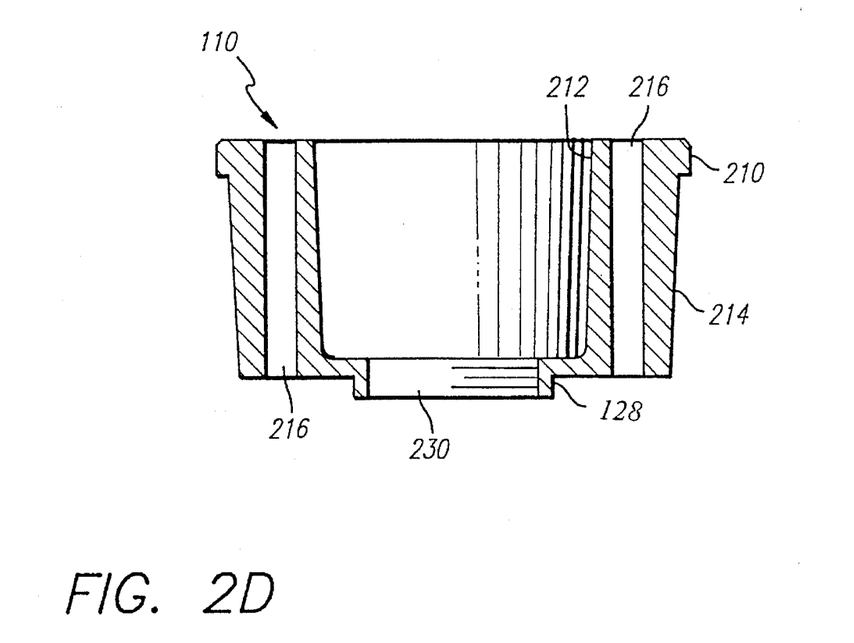

Referring now to FIG. 1, an electric machine 10, e.g. a portable electric supply, according to certain aspects of the present invention suitably comprises: a motor 20, having a shaft 102; a flywheel 104 disposed on shaft 102; and a generator 30 having an electrical outlet 170. Electrical outlet 170 is a conventional electrical outlet formed in the side of supply 10, which provides a connection for an electrical load, such as equipment, electric lights, power tools, or appliances.

Motor 20 may comprise any suitable source of mechanical energy, such as, for example, an internal combustion engine, or preferably, a conventional diesel engine, which transfers power to generator 30 by causing shaft 102 and flywheel 104 to rotate.

The rotational energy of motor 20 is transformed into electrical energy by generator 30. Generator 30 comprises: a mounting adapter 110; a rotor 112; a stator 114; a rotating bearing mount 116; a stationary bearing mount 118; a bearing 130; a transformer 120 having a rotating section 122 and a stationary section 124; a control circuit 702, including a stationary portion 702A and a rotating portion 720; and a housing 126.

Generator 30 may comprise any electrical generator for transforming mechanical energy into electrical energy, including DC and AC generators. Generator 30 may produce any number of phases and may be constructed according to various generator designs. In the preferred embodiment, generator 30 comprises a single-phase, 4-pole salient-pole induction generator.

Rotating mounting adapter 110 couples the rotating portion of generator 30 to flywheel 104. The rotation of flywheel 104, and hence the energy of motor 20, is thus transferred to the rotating portion of generator 30. Referring now to FIG. 1 and FIGS. 2A–D, rotor mounting adapter 110 includes a rigid and durable member, composed of, e.g., cast steel, including a peripheral circular flange 210, a hollow interior surface 212, also circular, body 214, which is cubic, having an outer surface 215, and a cylindrical protrusion 128. Rotor mounting adapter 110 is disposed with flange 210 abutting flywheel 104. Longitudinal apertures 216 (FIGS. 2A, 2C and 2D) are formed through flange 210 and cubic portion of rotor mounting adapter 110, preferably in the proximate area of the cubic portion corners. Cylindrical protrusion 128 is disposed at the end of rotor mounting adapter 110 opposite flange 210, and includes a threaded hole 230 formed therethrough.

Figure 3:
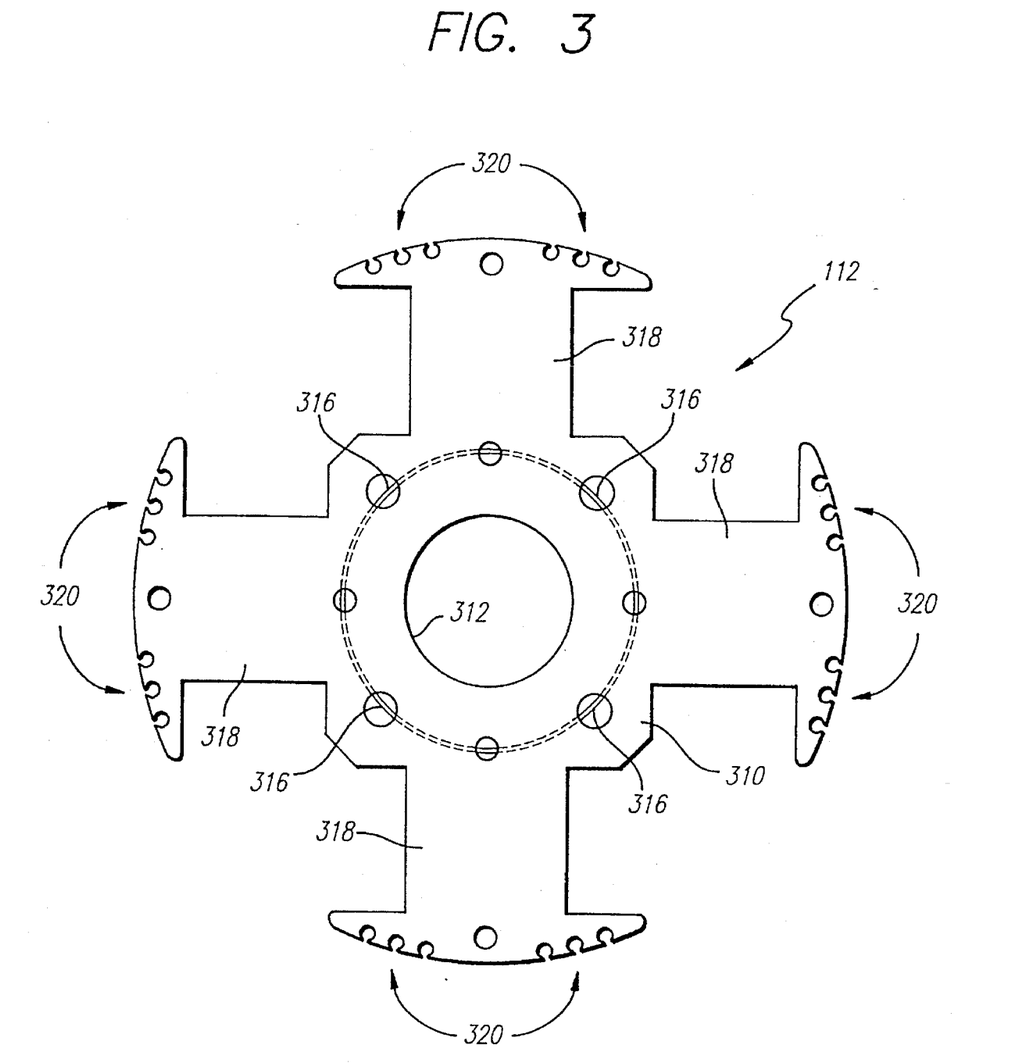
FIG. 3 is a front view of the rotor in FIG. 1 without an exciter winding on the poles.
Figure 4:
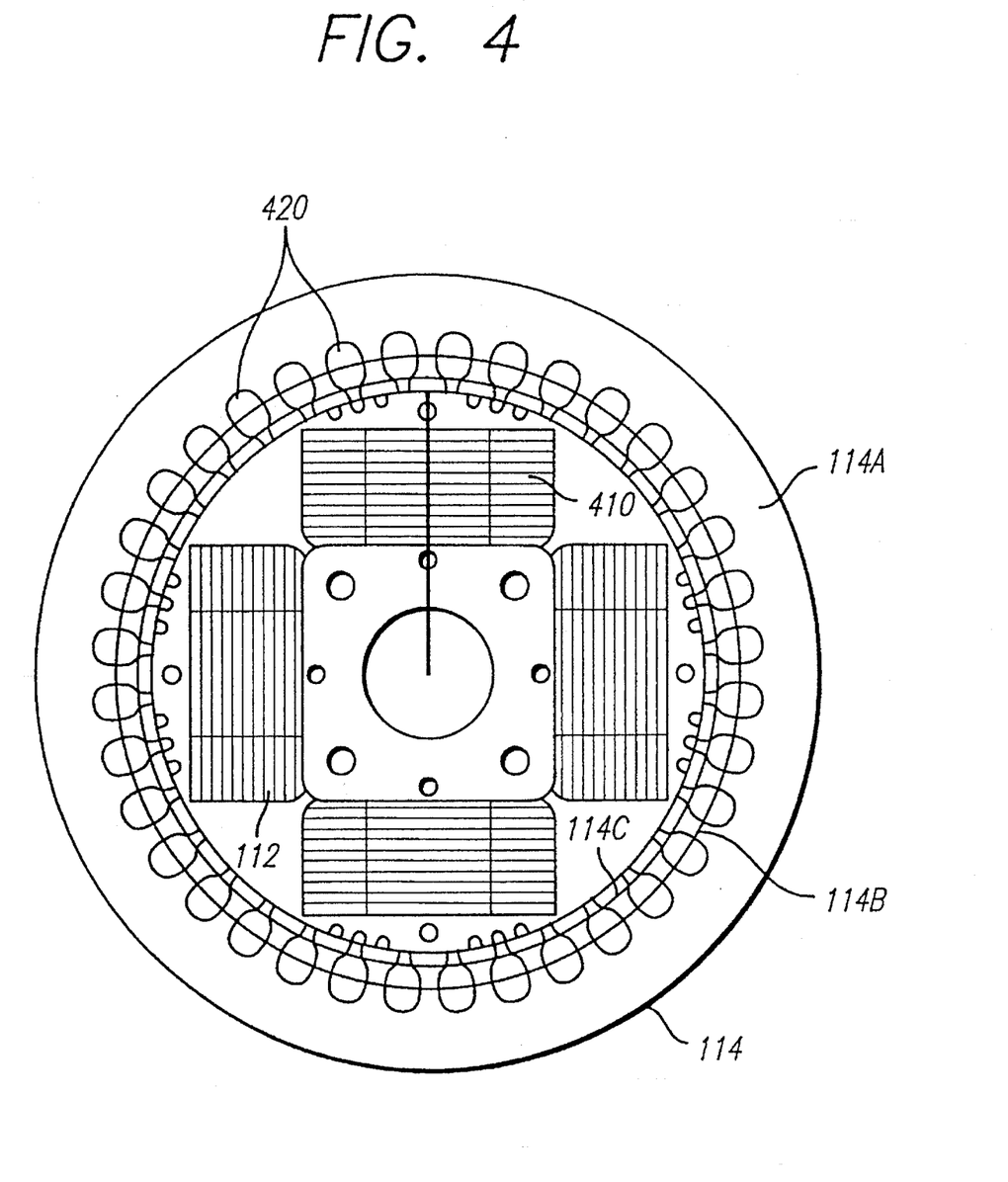
FIG. 4 is a front view of the stator in FIG. 1 without a main winding or an excitation winding, and the rotor in FIGS. 1 and 3 having an exciter winding in the poles.

Referring to FIGS. 3 and 4, rotor 112 comprises a four-pole, salient-pole rotor including a central portion 310; respective poles 318, and an excitor winding 410. Central portion 310 conforms in configuration to surface 215 of rotor mounting adapter 110, i.e. is square and of similar dimension, and includes centrally disposed hole 312, of slightly greater inside diameter than the outside diameter of protrusion 128. In assembly, as shown in FIG. 1, protrusion 128 is received snugly in rotor hole 312. Rotor 112 is fixed to surface 215 of rotor mounting adapter 110 so that rotation of rotor mounting adapter 110, induced by rotation of flywheel 104, causes rotor 112 to rotate as well. For example, four apertures 316 (FIG. 3) are formed through the central portion 310, disposed for registry with apertures 216 of rotor mounting adapter 110. Respective bolts (not shown) are journaled through apertures 316, rotor mounting adapter apertures 216, and flywheel 104 to fix rotor 112, and rotor mounting adapter 110 to flywheel 104.

Rotor 112 is comprised of laminated iron, and each of poles 318 is wound with conductive material, for example copper wire, to form excitor winding 410 (FIG. 4). Rotor 112 is laminated to reduce core losses. Grooves 320 are formed on the end surface of each pole 318, to receive shorting bars of electrically conducting material, to control eddy currents and improve the wave shape of the developed signal. Current flowing through excitor winding 410 generates a magnetic field having lines of flux substantially parallel to the longitudinal axis of each winding and pole. As motor 20 turns flywheel 104 and rotor mounting adapter 110, rotor 112 rotates past the winding on stator 114 (FIGS. 1 and 4) to induce electric current in a winding on stator 114, as described below.

Referring to FIG. 4, stator 114 comprises a frame 114A composed of, for example, laminated iron, with a predetermined number, e.g., 36, of slots 420, and is fixed to housing 126 (FIG. 1), disposed concentrically around the perimeter of rotor 112 (FIG. 4). The inner diameter of stator 114 is slightly greater than the diameter of rotor 112 from pole to opposite pole. Conductive material, for example copper wire, is wound around stator frame 114A in slots 420 to form a main winding 114B (shown schematically only). Main winding 114B comprises a three-phase or single-phase winding according to the particular design or application. The number of windings and the number of turns for each winding may vary according to the desired output of generator 30. A minimal clearance between the end of each pole 318 and inner surface of stator 114 provides optimal coupling between the magnetic field generated by rotor excitor winding 410 and the main stator winding. As the magnetic field generated by current flowing in excitor winding 410 passes the main winding, current is induced in the main winding, and provided to electrical outlet 170.

An excitation winding 114C (shown schematically only), composed of conductive material, for example copper wire, is also wound around stator frame 114A, preferably such that the signal generated in the excitation winding is 90° out of phase with the signal in the main winding to minimize interference between the respective signals. As will be explained, excitation winding 114C supplies current to rotor excitor winding 410 through transformer 120 and control circuit 702 to generate excitor winding's 410 magnetic field.

Figure 5:
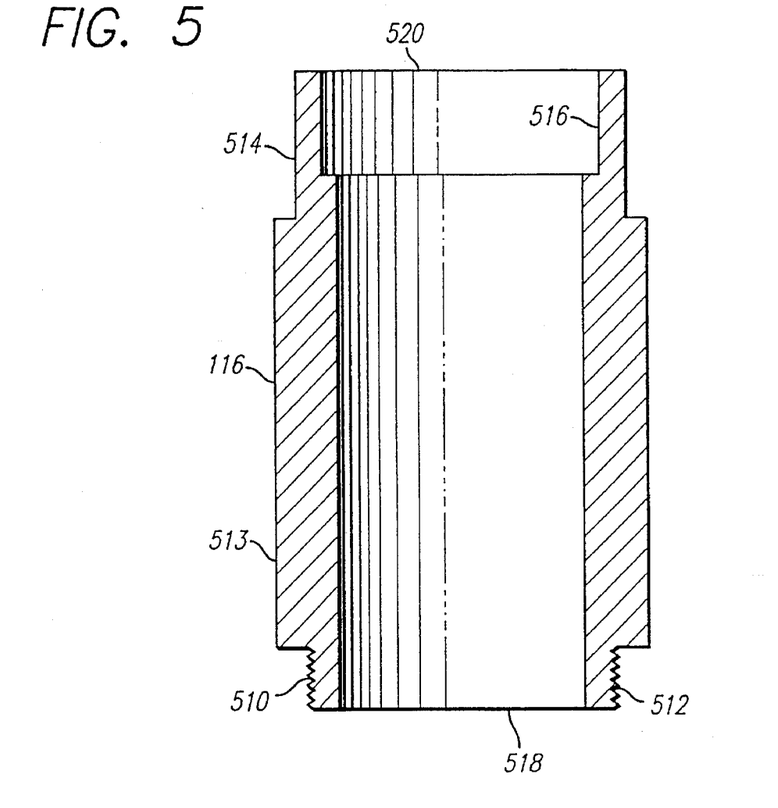
FIG. 5 is a sectional view of the rotating bearing mount in FIG. 1.

Current from excitor winding 114C is supplied to rotor excitor winding 410 through rotating transformer 120. The respective portions of transformer 120 are maintained in rotatable proximate disposition by rotating and stationary bearing mounts 116 and 118 and bearing 130. Referring to FIGS. 1 and 5, rotating bearing mount 116 is secured to rotor adapter mount 110, extending through rotor hole 312. Rotating bearing mount 116 is preferably cylindrical, with first and second open ends 518 and 520 and a hollow interior, and formed of a rigid, durable, and lightweight material, e.g., aluminum. End 518 of rotating bearing mount 116 suitably includes a cylindrical protrusion 510 having a threaded exterior surface 512, configured to engage the threaded interior of hole 230 of adapter 110. The exterior diameter of rotating bearing mount 116 (surface 513) is slightly less than the diameters of rotor mounting adapter cylindrical protrusion 128 and rotor hole 312 so that the interior surface of rotor hole 312 is separated from exterior surface 513 of rotating bearing mount 116 to facilitate assembly. Threaded surfaces maintain substantially constant orientation between rotor mounting adapter 110 and bearing mount 116. Thus, rotor mounting adapter 110, rotor 112, and rotating bearing mount 116 form a single rigid assembly that rotates with flywheel 104.

End 520 of rotating bearing mount 116 is configured to receive bearing 130, and to conform to the interior of, and rotate in close proximity to, stationary bearing mount 118. The exterior surface of rotating bearing mount 116 is stepped to a smaller diameter 514, and includes a stepped inner surface having a greater diameter to form a chamber 516 opening at end 520. Stepped exterior surface 514 forms a circular race which receives ball bearing 130, as will be further discussed. Chamber 516 receives rotating section 122 of transformer 120, as described further hereinbelow. Hollow interior of rotating bearing mount 116 houses a rotating portion 720 of control circuit 702, as will be explained.

Figure 6:
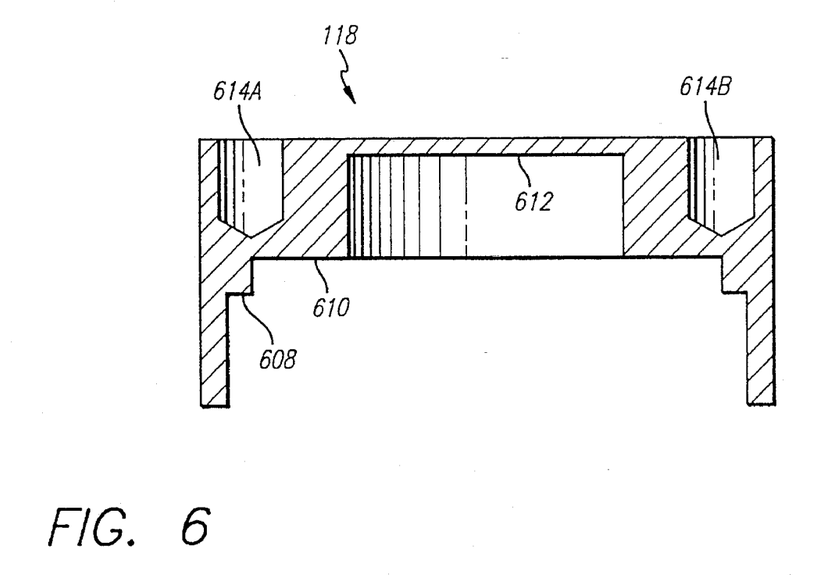
FIG. 6 is a sectional view of the stationary bearing mount in FIG. 1.

Referring to FIG. 6, stationary bearing mount 118, composed of a suitable lightweight, rigid, and strong material, such as aluminum, is generally cylindrical with a multiple-stepped interior cavity configured to receive end 520 of rotating bearing mount 116. A first step 608 of interior surface forms an outer circular race which receives bearing 130 to permit bearing mount 116 to rotate relatively freely with respect to stationary bearing mount 118. Respective concentric cavities 610 and 612 receive end 510 of rotating mount 116 and stationary section 124 of transformer 120, respectively.

Bearing 130 (FIG. 1), for example a ball bearing, permits rotating bearing mount 116 to rotate with rotor mounting adapter 110 and rotor 112 relatively freely with respect to stationary bearing mount 118. Stationary mount 118 is mounted for limited axial movement but radially fixed with respect to housing 126. For example, multiple recesses 614A,B, suitably two, may be formed in the surface of stationary bearing mount 118 facing housing 126. Recesses 614A,B receive pegs 132A,B (FIG. 1) protruding from interior wall of housing 126. Pegs 132A,B permit stationary bearing mount 118 to move axially, but prevent rotation or radial movement with respect to housing 126. A spring 134 mounted between stationary bearing mount 118 and housing 126 biases stationary bearing mount 118 against ball bearing 130 and towards the rotating assembly, i.e. rotating bearing mount 116, rotor 112, and rotor mounting adapter 110.

Transformer 120 comprises identical rotating and stationary sections 122 and 124, each section including a core 136, 138 and a spool 140, 142. Rotating and stationary cores 136 and 138 are suitably cylindrical and formed of, for example, soft ferrite or other suitable ferromagnetic material. Each core 136, 138 has a recess formed therein for fixedly receiving a corresponding spool 140, 142, comprised of a rigid, electrically insulative and heat resistant material. Each spool 140, 142 includes a groove which receives a number of turns of conductive material, such as copper wire, forming windings (not shown). The number of turns may be identical, although any number of turns may be used for each spool 140, 142.

Rotating core 136 is fixed, for example by an adhesive or welding, in chamber 516 of rotating mount 116 so that rotating section 122 rotates with rotating mount 116. Similarly, stationary core 138 is fixed in chamber 612 of stationary bearing mount 118 so that stationary section 124 remains fixed with respect to housing 126. A small air gap is interposed between the adjacent surfaces of rotating section 122 and stationary section 124, and similarly between the adjacent surfaces of rotating mount 116 and stationary bearing mount 118. Ball bearing 130, disposed between rotating mount 116 and stationary bearing mount 118, is suitably sized to maintain the air gap. The air gap is preferably very narrow, for example 0.02 inches, to optimize magnetic coupling between rotating core 136 and stationary core 138, and simultaneously allow rotation. Spring 134 biases stationary bearing mount 118 towards rotating bearing mount 116 so that ball bearing 130 maintains a minimal air gap between rotating core 136 and stationary core 138.

Alternating current flowing in the transformer stationary winding on core 138 generates an alternating magnetic field having lines of flux substantially parallel to the longitudinal axis of stationary core and spool. The narrowness of the air gap optimizes magnetic coupling between rotating section 122 and stationary section 124, so that the generated magnetic field permeates rotating section 122. As the magnetic field permeates rotating core 136 and spool 140, the alternating magnetic field induces an alternating current in transformer rotating winding 122. The current and voltage induced in transformer rotating winding 122 is dependent upon the ratio of the number of turns in the respective windings on stationary spool 142 and rotating spool 140, as well as the effectiveness of the magnetic coupling between stationary section 124 and rotating section 122. Because rotating section 122 rotates, the angular orientation between rotating section 122 and stationary section 124 varies, but the longitudinal distance between the respective sections 122, 124 remains constant. Consequently, the magnetic coupling between rotating section 122 and stationary section 124 remains substantially constant.

Current induced in transformer 120 rotating winding is rectified and provided to excitor winding 410, as described further below. Current flowing through excitor winding 410 generates an electromagnetic field. As motor 20 turns rotor mounting adapter 110 and rotor 112, the electromagnetic field generated by excitor winding 410 intercepts and moves relative to main winding 114B and excitation winding 114C, inducing an alternating current flow in each winding. The current induced in main winding 114B is provided to electrical outlet 170 of generator 30, and current induced in excitation winding 114C is provided to exciter winding 410 to maintain the electromagnetic field.

Figure 7:
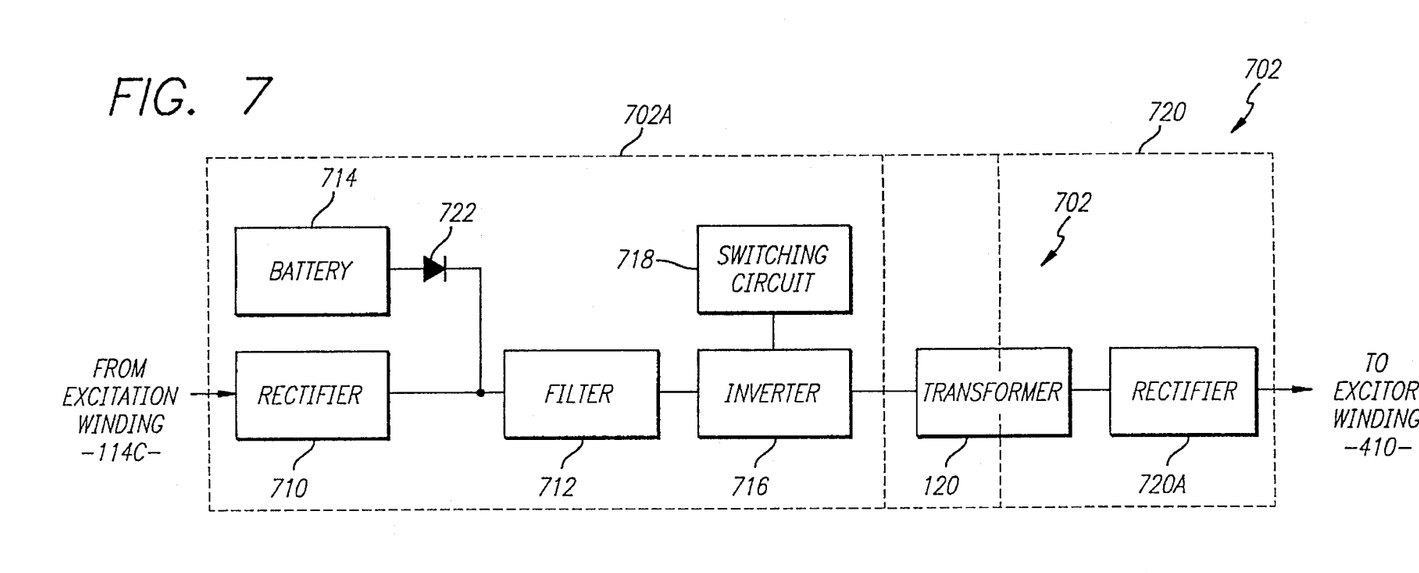
FIG. 7 is a block diagram of a control circuit according to various aspects of the present invention.
Figure 8:
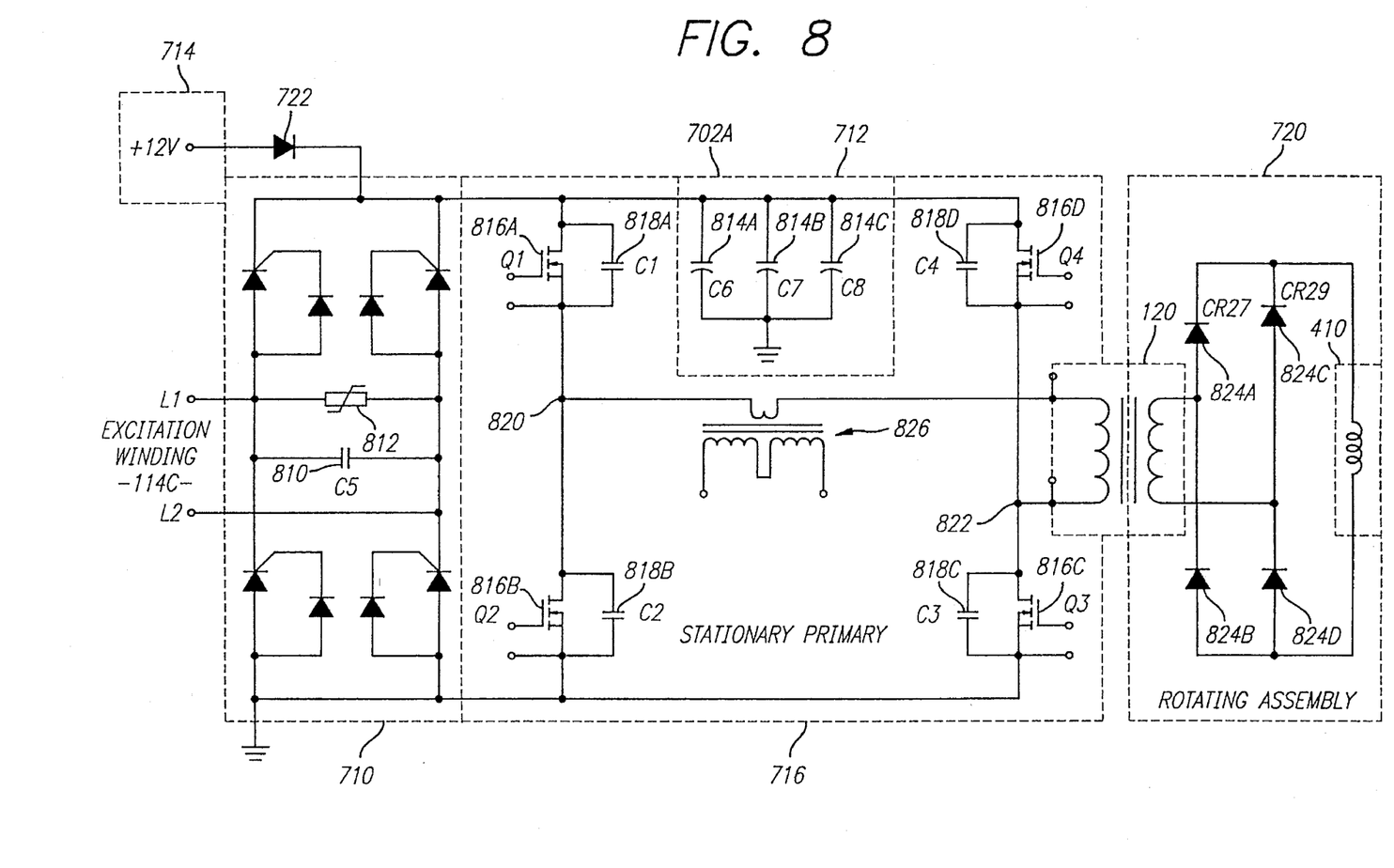
FIG. 8 is a schematic diagram of an embodiment of the control circuit of FIG. 7.

Referring now to FIGS. 7 and 8, the flow of current from the excitation winding 114C to rotor exciter winding 410 is controlled by control circuit 702. Control circuit 702 generates and shapes the signal to be transmitted through transformer 120 to exciter winding 410, and is supplied by excitation winding 114C. Control circuit 702 comprises stationary portion 702A and rotating portion 720. Stationary portion 702A includes: a rectifier 710; a filter 712; an independent voltage source, such as a battery 714; an inverter 716; and a switching circuit 718 (FIG. 7). Rotating portion 720 includes a second rectifier 720A.

Rectifier 710 receives and rectifies the alternating signal from excitation winding 114C. Typically, excitation winding 114C generates an alternating signal at 60 Hz. Transformer 120 is preferably small to minimize the size of generator 30. Accordingly, high frequency signals are preferably transmitted through transformer 120 to maximize power transfer and minimize size. Thus, rectifier 710 converts the 60 Hz signal frown excitation winding to a direct current signal, which may then be converted to a higher frequency alternating signal by inverter 716. Rectifier 710 suitably comprises a conventional four-diode, full-wave bridge rectifier (FIG. 8). Rectifier 710 also suitably includes a smoothing mechanism for eliminating signal anomalies, such as power surges and voltage spikes, from the rectifier signal. For example, a capacitor 810 and a power absorber 812 may be connected to opposite sides of bridge rectifier 710 to shunt voltage and power anomalies from the signal transmitted by rectifier 710.

The rectified signal is provided to filter 712, which smooths the shape and supports the voltage level of the signal received from rectifier 710. Filter 712 supports the voltage level to continuously provide at least a minimum voltage signal for conversion to an alternating current signal. Filter 712 comprises a plurality of, e.g. three, capacitors 814A–C connected in parallel between the output of rectifier 710 and ground. Capacitors 814A–C charge as the output voltage level of rectifier 710 surpasses the voltage level on capacitors 814A–C, and as the voltage level of rectifier 710 signal drops below the voltage level of capacitors 814A–C, capacitors 814A–C discharge. Because of the load on transformer 120, capacitors 814A–C discharge relatively slowly compared to the cycling of rectifier 710 signal, and the resulting direct current signal remains relatively smooth and constant.

Filter 712 also receives a constant voltage signal from, e.g., battery 714. Battery 714 supplies initial voltage to excitor winding 410 when generator 30 is started. As current begins to flow in excitation winding 114C, the signal received from excitation winding 114C and supported by filter 712 overtakes the voltage level from battery 714, so that battery 714 is unnecessary once generator 30 is started. Typically, battery 714 need only supply current for less than a second. The connection between battery 714 and filter 712 is equipped with a diode 722 to prevent battery 714 from being subjected to a charging current as the voltage transmitted by rectifier 710 exceeds battery 714 voltage, which might damage or destroy battery 714.

Inverter 716 converts the direct current signal transmitted by filter 712 into an alternating current signal. A relatively high frequency (e.g. 20 kHz) alternating current signal is preferable; it provides sufficient power across transformer 120 without requiring an unduly large transformer 120. For example, inverter 716 comprises an electrically controlled double-pole double-throw switch, having four switches, such as field effect transistors (FETs), 816 A–D, connected in a bridge pattern between the output of filter 712 and ground (FIG. 8). Capacitors 818A–D are connected in parallel with each FET 816A–D to bypass signal anomalies around each FET 816A–D. Such anomalies are thus provided to both sides of the bridge, effectively canceling the anomaly. FETs 816A–D are switched to alternately connect filter 712 output to ground, first through FETs 816A and C, and then through FETs 816B and D. The output of inverter 716 is taken from a node 820 between FETs 816A and B and a node 822 between FETs 816C and D. Transformer 120, connected to inverter 716 at nodes 820, 822, receives a square wave alternating current signal having its frequency dependent upon the frequency at which FETs 816A–D are switched.

Output nodes 820, 822 of inverter 716 are connected to stationary winding 142 of transformer 120, which generates an alternating current in winding in rotating section 122. The winding on rotating spool 140 is connected to rectifier 720, suitably a full-wave bridge rectifier comprising four diodes 824A–D. Rectifier 720 is suitably disposed within hollow rotating bearing mount 116, preferably fixed along the longitudinal axis of rotating bearing mount 116, so that rectifier 720 rotates with rotating section 122, rotating bearing mount 116, and rotor 112. Rectifier 720 supplies a substantially constant direct current signal to excitor winding 410 on rotor 112, which provides the magnetic field for generating current in the windings on stator 114.

Figure 9:
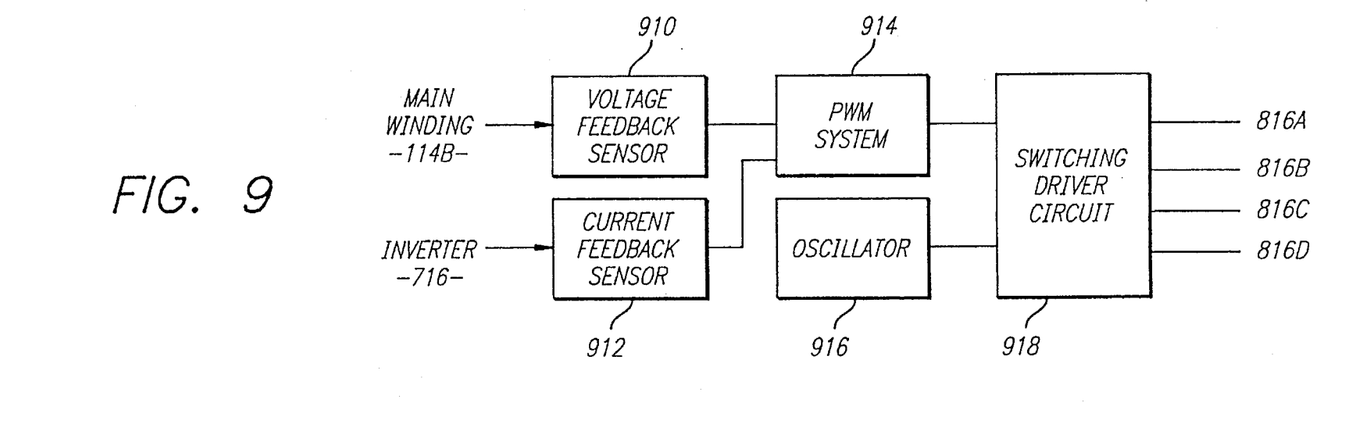
FIG. 9 is a block diagram of a switching circuit for controlling the switches of the inverter in FIGS. 7 and 8.
Figure 10A:
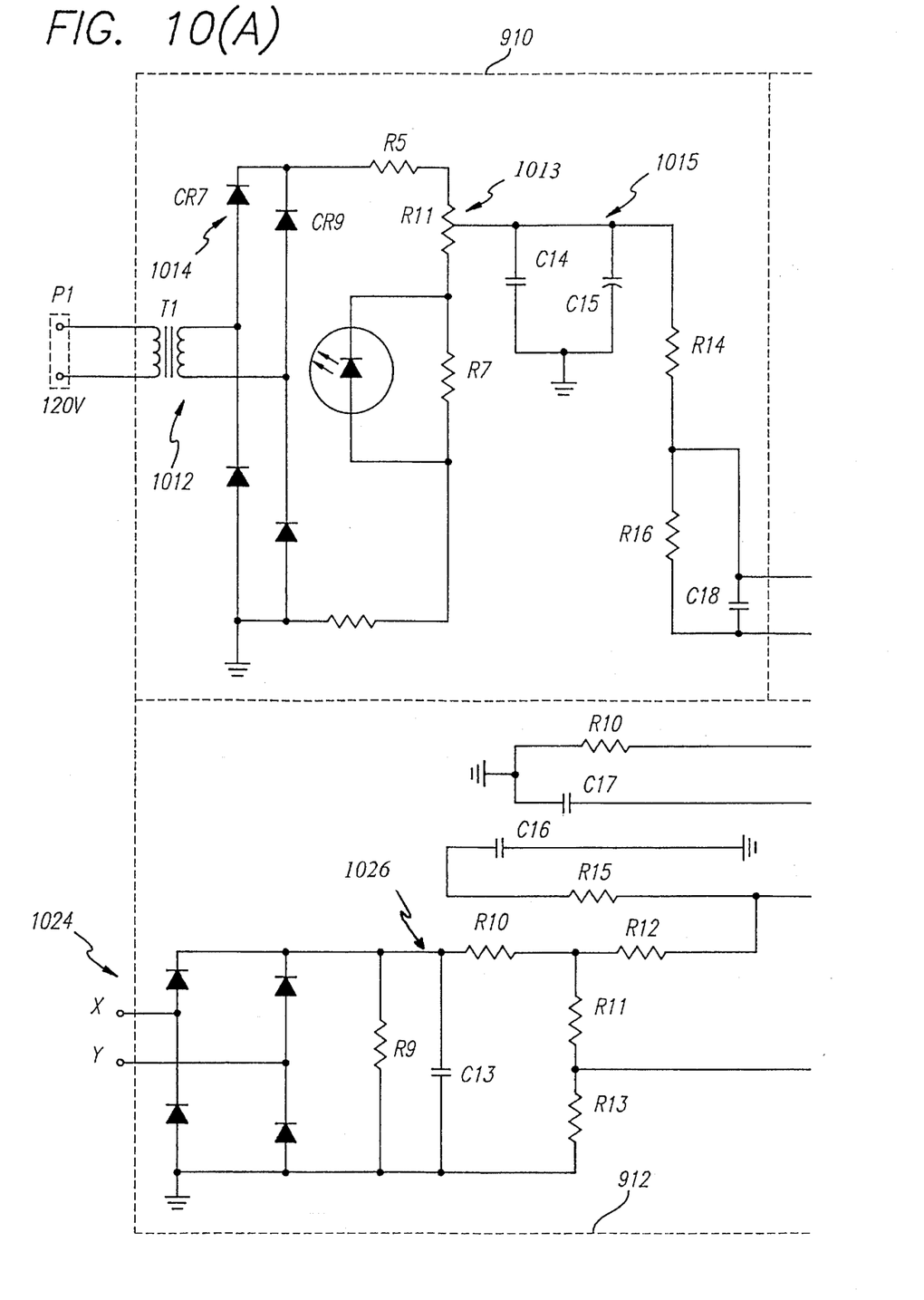
FIG. 10 is a schematic diagram of an embodiment of the switching circuit of FIG. 9.
Figure 10B:
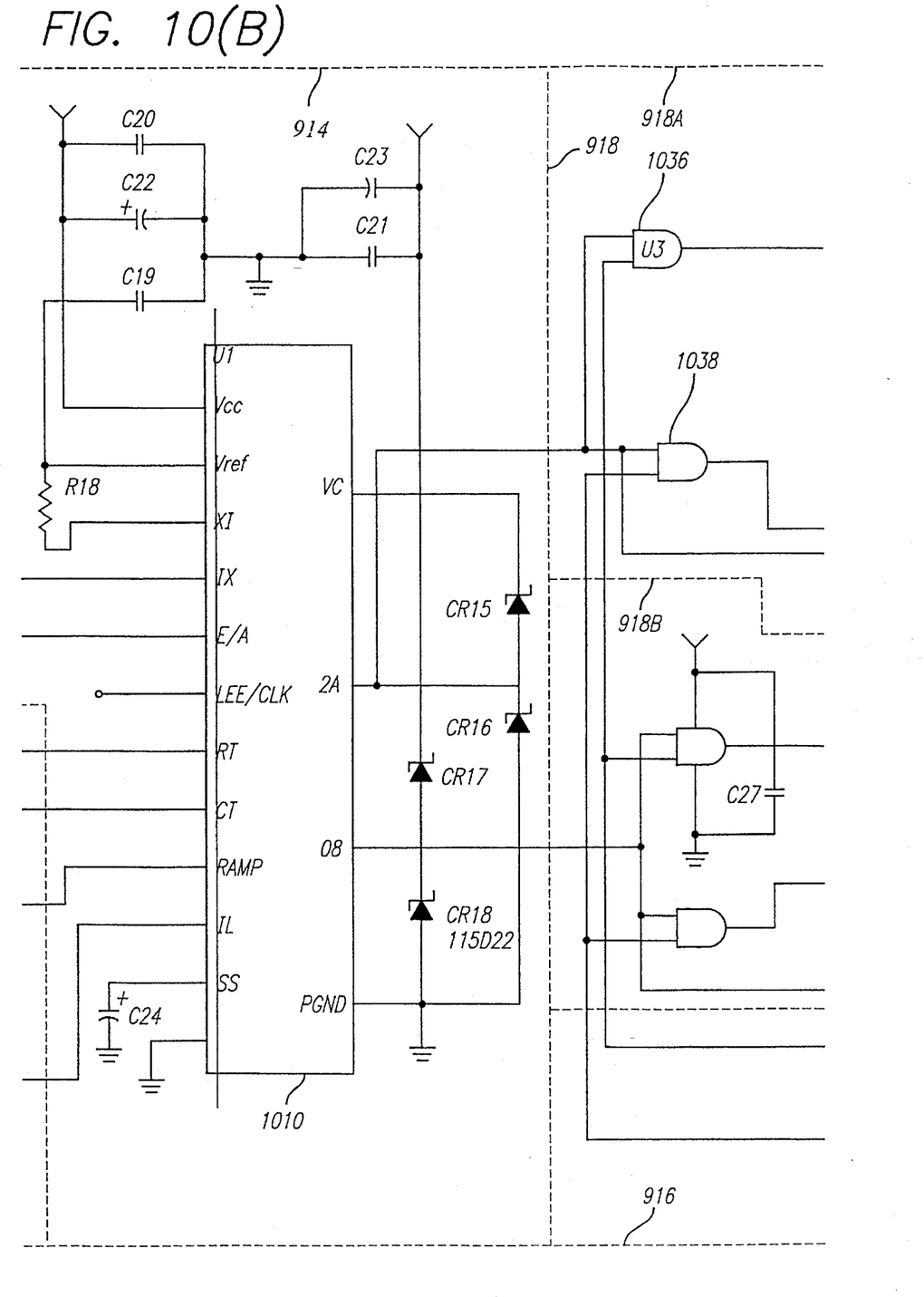
Figure 10C:
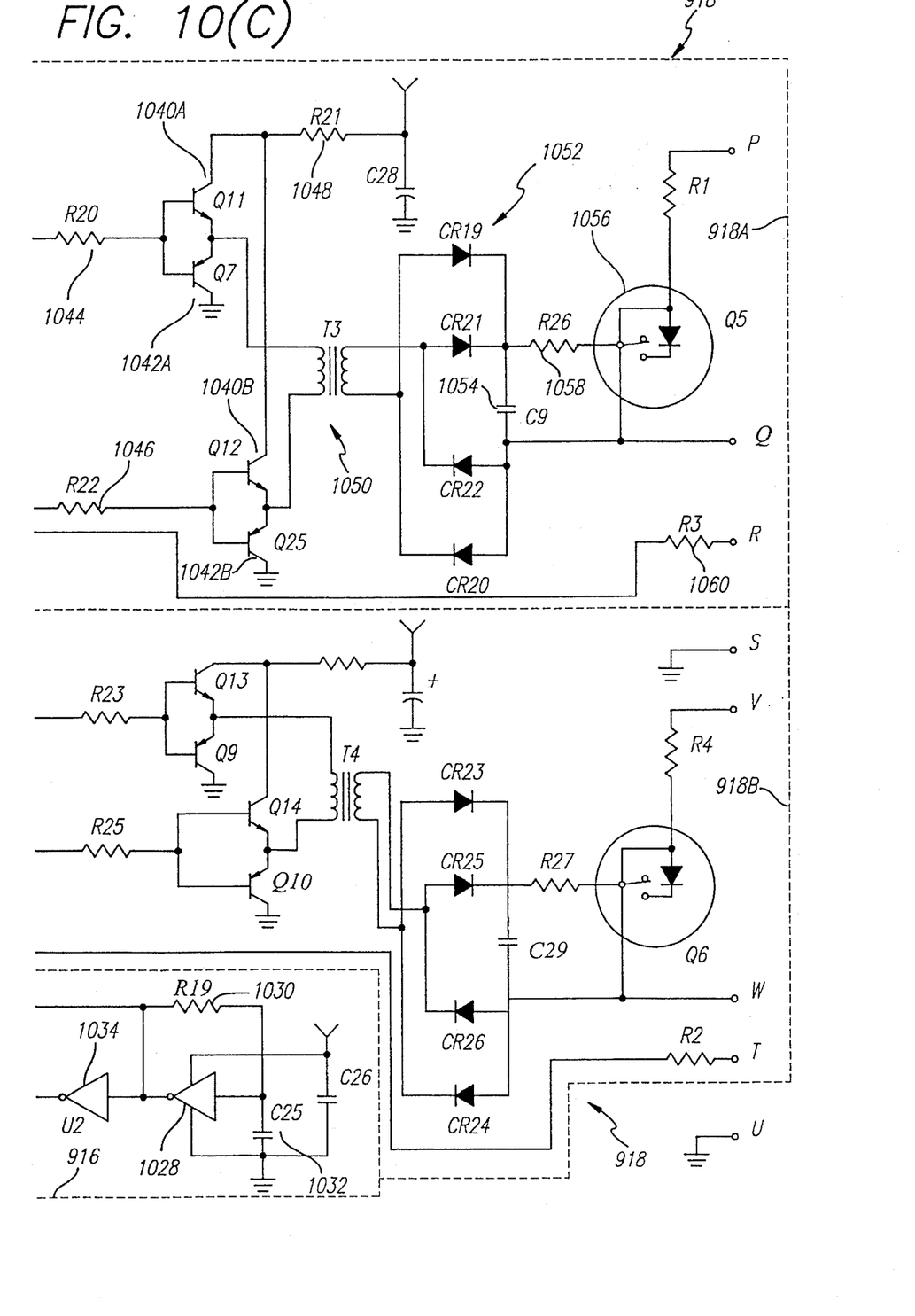

The power supplied by main stator winding 114B is controlled by a suitable voltage and/or current regulation system. The regulation system controls the output of supply 10 to provide sufficient voltage and current without overloading supply 10. In the embodiment illustrated by FIG. 7 and 8, the power supplied by main winding may be controlled by switching FETs 816A–D at the appropriate frequency and duration to control the current supplied to excitor winding 410. For example, the switching of FETs 816A–D may be controlled by switching circuit 718 (FIG. 7) which controls the current in excitor winding 410 through pulse width modulation (PWM). PWM systems typically selectively alter the duty cycle of a signal, a square wave signal, to modulate the power of the signal. Referring also to FIGS. 9 and 10, switching circuit 718 includes a voltage feedback sensor 910, suitably connected to stator main winding 114B; a current feedback sensor 912, suitably connected to inverter 716; a pulse width modulation (PWM) system 914; an oscillator 916; and switching driver circuitry 918 providing switching signals to FETs 816A–D.

PWM system 914 modulates the signal provided to FETs 816A–D. PWM system 914 activates FETs 816A–D according to the needs of generator 30. FETs 816A–D are switched on for a longer duration to provide greater power to excitor winding 410, and a shorter duration to reduce the power to excitor winding 410. This selective variation of the power supplied to excitor winding 410 varies the current supplied by the main winding on stator 114, thus providing for constant adjustment of generator's 30 output. PWM system 914 receives feedback signals from stator main winding 114B to control PWM system 914. For example, PWM system 914 includes a PWM integrated circuit 1010, such as a Motorola MC34025 High Speed Double-Ended PWM Controller. In response to signals received from voltage feedback sensor 910, PWM integrated circuit 1010 adjusts (modulates) the duration of signals provided to FETs 816A–D through switching driver circuit 918, thus varying the power provided to excitor winding 410 on rotor 112. The output of PWM integrated circuit 1010 is also subject, however, to signals received from current feedback sensor 912, which may override the signal received from voltage feedback sensor 910 to control the maximum current through FETs 816A–D and transformer 120 to prevent overloading.

Voltage feedback sensor 910 comprises a transformer 1012; a rectifier 1014; a manual output adjustment circuit 1013; and a filter 1015. Transformer 1012 is an isolation transformer, connected to the terminals of main winding 114B. Transformer 1012 transmits the signal generated by main winding 114B, but electrically isolates the remainder of switching circuit 718 from main winding 114B. The output terminals of transformer 1012 are connected to rectifier 1014, a full-wave, four-diode bridge rectifier, which converts the alternating signal of transformer 1012 into a direct current signal to be provided to PWM system 914.

The output of rectifier 1014 is connected to manual output adjustment circuit 1013. Manual output adjustment circuit 1013 permits calibration and adjustment to provide the desired output. In the present embodiment, manual output adjustment circuit 1013 comprises a resistive circuit having selectively variable resistance, such as a potentiometer 1016. Potentiometer 1016 permits the desired voltage to be adjusted manually by the user within a predetermined range, for example, 105–130 volts, according to the user's needs.

Manual output adjustment circuit 1013 is connected to filter 1015, which is connected to an input of PWM integrated circuit 1010. Filter 1015 smooths the ripple in the rectified signal to provide a relatively smooth direct current equivalent of the transformer 1012 signal which may be effectively used by PWM integrated circuit 1010.

Current feedback sensor 912 is connected between output nodes 820, 822 of inverter 716. Current feedback sensor 912 senses the current output of inverter 716 provided to excitor winding 410. Current feedback sensor 912 may also be connected to PWM system 914 so that if the sensed current exceeds a predetermined threshold, PWM system 914 ceases to increase power to the excitor winding 410. As a result, the current through inverter 716 and excitor winding 410 will not exceed a predetermined threshold, preventing an overload of exciter winding 410 and inverter 716. Current feedback sensor 912 comprises: a transformer 826; a rectifier 1024; and a filter 1026. Transformer 826 comprises, for example, a low impedance transformer 826 (FIG. 8) connected between output nodes 820, 822 of inverter 716 to sense the current level in inverter 716. Rectifier 1024, for example, a full-wave four-diode bridge rectifier rectifies the transformer 826 signal for use by PWM system 914. Rectifier 1024 is connected to filter 1026, which smooths the ripple in the rectified signal to provided a substantially smooth direct current equivalent of the rectified signal. The filtered signal is appropriately provided to PWM integrated circuit 1010 to control the signal provided by PWM system 914 to FETs 816A–D to prevent overload of transformer 120 and FETs 816A–D.

In accordance with signals provided by voltage feedback sensor 910 and current feedback sensor 912, PWM system 914 provides signals to switching driver circuit 918. Switching driver circuit 918 alternately activates FETs 816A,C and FETs 816B,D for selected durations to provide the appropriate power to exciter winding 410 and maintain the proper voltage on main winding 114B in response to signals provided by PWM system 914 and oscillator 916. Oscillator 916 provides an alternating current signal to switching driver circuit 918, a square wave signal, at a significantly higher frequency than the signal provided by inverter 716. Oscillator 916 comprises an inverting Schmitt trigger 1028 having its input connected to a feedback circuit, suitably comprising a feedback resistor 1030 and a capacitor 1032 connected between Schmitt trigger's 1028 input and ground. Oscillator 916 is connected to battery 714 to supply power. Resistor 1030 and capacitor 1032 values are selected to provide a particular frequency at which the output signal of Schmitt trigger 1028 is desired to oscillate, for example, approximately four times the frequency of the inverter, or 80 kHz. A second inverting Schmitt trigger 1034 has its input connected to the output of first Schmitt trigger 1028, which generates an inverse signal from that generated by first Schmitt trigger 1028.

The primary and inverse signals generated by oscillator 916 are provided to switching driver circuit 918 in conjunction with signals from PWM system 914 to control the switching of FETs 816A–D. Switching driver circuit 918 suitably comprises two similar sections 918A,B, connected to FETs 816A,B, and to FETs 816C,D, respectively. Therefore only one section 918A is described in detail herein.

First section 918A of switching driver circuit 918 comprises a pair of two input AND logic gates 1036, 1038, each having an input connected to the primary output of PWM integrated circuit 1010. The second input of each AND gate 1036, 1038 is connected to the primary output and inverting output of oscillator 916, respectively. Thus, the outputs of AND gates 1036, 1038 are regulated by the output of PWM integrated circuit 1010 so that if the primary output of PWM integrated circuit 1010 is high, the output of one of AND gates 1036, 1038 is high; if the primary output of PWM integrated circuit 1010 is low, neither AND gate 1036, 1038 provides a high output signal.

The output of each AND gate 1036, 1038 is connected to a pair of switches suitable for high power applications. For example, the output of each AND gate 1036, 1038 may be connected to the bases of two transistors, bi-polar junction transistors (BJTs) 1040A–B, 1042A–B, through a resistor 1044, 1046 in series between each AND gate 1036, 1038 and BJTs 1040A–B, 1042A–B. Transistors 1040A–B are npn BJTs, having their collectors connected to battery 714 through resistor 1048 and their emitters connected to the collectors of transistors 1042A–B. Transistors 1042A–B may be pnp BJTs, having their collectors connected to the emitters of BJTs 1040A–B and their emitters connected to ground. BJTs 1040A–B, 1042A–B is power transistors having sufficient capacity to drive an isolation transformer 1050 having its primary winding terminals connected to the nodes between BJTs 1040A, 1042A, and BJTs 1040B, 1042B. Isolation transformer 1050 comprises a doughnut core transformer for isolating the remainder of switching driver circuit 918, which operates in a low voltage, low current environment, from inverter 716, which operates in a high voltage, high current environment.

When the output of AND gate 1036 is high, the output of AND gate 1038 is low. Thus, corresponding BJTs 1040A, 1042B switch on and BJTs 1040B, 1042A switch off, so that a terminal of isolation transformer 1050 is connected to the battery 714 through BJT, and another terminal is connected to ground through BJT 1042B. When the output of AND gate 1036 switches to low and gate 1038 switches to high, BJTs 1040A, 1042B switch off and BJTs 1040B, 1042A switch on, connecting second terminal of the primary winding to battery 714 through BJT 1040B and first terminal to ground through BJT 1042A. Thus, the switching of the outputs of AND gates 1036, 1038 generates an alternating current through the primary winding of isolation transformer 1050.

Alternating current in the primary winding of isolation transformer 1050 generates proportional current in a secondary winding having its terminals connected to a rectifier 1052. Rectifier 1052 is a full-wave, four-diode bridge rectifier, having a capacitor 1054 connected between its output terminals to shunt anomalies in the rectified signal. Rectifier 1052 is connected to a transistor 1056 through a resistor 1058. Transistor 1056 is a MOSFET having its gate connected to the source of FET 816A and its source connected to the gate of FET 816A. Transistor 1056 has a very fast rise time so that the rectified signal causes transistor 1056 to provide a square wave to drive FETs 816A,D.

FET 816B is controlled directly by the primary output of PWM integrated circuit 1010. The gate of FET 816B is connected to the primary output of PWM integrated circuit 1010 through a resistor 1060. The source of FET 816B is connected to ground. Thus, when the output of the primary output of PWM integrated circuit 1010 is high, FET 816B switches on and connects the associated leg of inverter 716 to ground. Unlike FET 816B, the source of FET 816A is subject to high voltage, and should not be connected directly to ground. Connecting the source of FET 816A directly to ground would short circuit the signal of inverter 716 to ground. Accordingly, it should be referenced to the reference voltage of switching driver circuit 918.

The counterpart section of switching driver circuit is substantially identical to the first section, except that second section is driven by signals from the secondary output of PWM integrated circuit 1010 and controls FETs 816C–D. The outputs of PWM integrated circuit 1010 are preferably high current dual totem pole outputs such that the respective outputs are alternately activated. Thus, secondary output of PWM integrated circuit 1010 is only driven high when the signal from primary output is low, and vice versa. Thus, PWM integrated circuit 1010 may provide signals to switching driver circuit 918 which alternately switch on FETs 816A,C and FETs 816B,D, generating an alternating current signal from inverter 716.

PWM system 914 alternately activates each section 918A and B of switching driver circuit 918 to alternately activate FETs 816A,C and 816B,D. The alternating current through the legs of inverter 716 provides an alternating current through transformer 120 which is provided to excitor winding 410. The duration of the pulses to FETs 816A–D is modulated by PWM system 914 to vary the current provided to excitor winding 410 and thus control the output at electric outlet 170. Regulation is provided by voltage feedback sensor 910, which senses the voltage output at electric outlet 170 and provides the appropriate signal to PWM system 914 to maintain a constant voltage level. In addition, current feedback sensor 912 monitors the current provided to excitor winding 410 and provides appropriate signals to PWM system 914 to prevent PWM system from providing too much current to excitor winding 410 and overloading transformer 120 and FETs 816A–D.

It should be noted that several aspects of the present invention may be applied to electric motors as well, in which electrical energy is transformed into mechanical energy. Although various aspects of the present invention are described herein in conjunction with a particular generator embodiment, it is to be understood that such disclosure is not to be interpreted as limiting. Various alterations and modifications may be made without departing from various aspects of the invention; therefore it is intended that the appended claims be interpreted to cover all variations and modifications as fall within the spirit and scope of the claims.

We claim:

1. An electric machine, comprising:
   a rotating portion including a rotor winding;
   a stationary portion;
   means juxtaposing said rotating portion with said stator portion for mutual rotation such that magnetic coupling therebetween defines a rotational frequency;
   a transformer with first and second windings, said first winding attached to said stationary portion and said second winding attached to said rotating portion and magnetically coupled to said first winding, such that current flowing in one of said windings induces current in the other of said windings; and
   a variable power source connected to said first winding to provide variable power to said second winding; and
   means electrically coupling said second winding to said rotor winding.

2. The electric machine of claim 1 wherein said variable power source comprises an inverter for generating a modulated signal of a predetermined frequency, where said predetermined frequency is higher than said rotational frequency.

3. The machine of claim 2 wherein said inverter is a pulse width modulated inverter.

4. The electric machine of claim 2 further including a sensor for generating a feedback signal indicative of an output signal of said stator main winding, where said feedback signal is applied to said variable power source to control modulation.

5. The electric machine of claim 1 wherein said rotating portion further comprises an engine shaft and a flywheel.

6. A brushless electric machine comprising:
   a rotatable assembly including a rotor winding disposed thereon;
   a stator including a main winding and an excitation winding disposed such that rotation of said rotatable assembly causes magnetic fields generated by said rotor winding to induce current in said stator main winding and said stator excitation winding;
   a rotating transformer winding disposed to rotate with said rotatable assembly and connected to provide current to said rotor winding;
   a stationary transformer winding magnetically coupled to said rotating transformer winding so that current through said stationary transformer winding generates a magnetic field to induce current in said rotating transformer winding to supply current to said rotor winding; and
   a variable power source coupled intermediate said stator excitation winding and said stationary transformer winding to regulate the current through said stationary transformer winding.

7. The brushless electric machine of claim 6 wherein:
   said rotatable assembly is adapted for connection at a proximal end to a rotation source;
   said rotating transformer winding is disposed at a distal end of said rotatable assembly; and
   said stationary transformer winding is adjacent to and axially aligned with said rotating transformer winding.

8. The brushless electric machine of claim 7 further including a first and second core of ferro-magnetic material, where said first core has a recess formed therein for fixedly receiving said stationary transformer winding, and said second core has a recess formed therein for fixedly receiving said rotating transformer winding.

9. The brushless electric machine of claim 8 further including first and second corresponding spools each comprised of an electrically insulative and heat resistant material and disposed about respective first and second cores, said first spool including a groove which receives a number of turns of conductive material forming said stationary transformer winding, and said second spool including a groove which receives a number of turns of conductive material forming said rotating transformer winding.

10. The brushless electric machine of claim 8 wherein said rotatable assembly includes a rotating bearing mount, and said rotating transformer winding is maintained in rotatable proximate disposition to said stationary transformer winding by a bearing cooperating with said rotating bearing mount and a stationary bearing mount.

11. The brushless electric machine of claim 6 wherein said rotatable assembly includes a rotating bearing mount, and said rotating transformer winding is maintained in rotatable proximate disposition to said stationary transformer winding by a bearing cooperating with said rotating bearing mount and a stationary bearing mount.

12. The brushless electric machine of claim 6 further comprising a rectifier disposed to rotate with said rotatable assembly and electrically connected to generate a rectified signal to said rotor winding from current induced in said rotating transformer winding.

13. The brushless electric machine of claim 12 further comprising a circuit for deriving an AC signal of predetermined frequency for application to said stationary transformer winding.

14. The brushless electric machine of claim 13 where current is induced in said stator main winding and said stator excitation winding at a rotational frequency determined by the rate of rotation of said rotatable assembly and in which said predetermined frequency is higher than said rotational frequency.

15. A brushless portable generator comprising:
   an engine having a rotating shaft; a rotor assembly coupled at a proximal end to said engine shaft, said rotor assembly including a rotor excitor winding;

a stator including a main winding and an excitation winding, said stator disposed with respect to said rotor assembly such that rotation of said rotor assembly causes magnetic fields generated by said rotor excitor winding to induce current in said main winding and said excitation winding at an electrical rotational frequency dependent upon the rate of rotation of said rotor assembly;

a transformer having a stationary portion with a primary winding electrically coupled to said stator excitation winding and a rotating portion with a secondary winding electrically coupled to said rotor excitor winding, where said rotating portion is disposed at said distal end of said rotor assembly; and said stationary portion is disposed adjacent to and axially aligned with said rotating portion, with said primary winding magnetically coupled to said secondary winding such that current flowing in said primary winding induces current in said secondary winding.

16. The portable generator of claim 15 wherein said stationary transformer portion includes a first core of ferromagnetic material, said first core having a recess formed therein for fixedly receiving said stationary transformer winding, and said rotating transformer portion includes a second core of ferro-magnetic material, said second core having a recess formed therein for fixedly receiving said rotating transformer winding.

17. The machine of claim 16 further including first and second electrically insulative and heat resistant spools disposed about said first and second cores, respectively, said first spool including a groove which receives a number of turns of conductive material forming said stationary transformer winding, and said second spool including a groove which receives a number of turns of conductive material forming said rotating transformer winding.

18. The said portable generator of claim 15 wherein said rotor assembly includes:

a rotating bearing mount axially aligned with said rotor excitor winding and coupled to said transformer rotating portion on said distal end; and in which said portable generator further includes:

a stationary bearing mount mechanically coupled to said transformer stationary portion; and a bearing rotatably coupling said rotating bearing mount to said stationary bearing mount so as to maintain a fixed and predetermined air gap between said transformer stationary portion and said transformer rotating portion.

19. The portable generator of claim 18 wherein said rotating bearing mount comprises a cylindrical tube coupled to said engine shaft at said proximate end thereof and includes a reduced diameter portion at said distal end thereof for receiving said bearing.

20. The portable generator of claim 19 further comprising means for axially biasing said stationary beating mount toward said rotor assembly to maintain said fixed and predetermined air gap.

21. The portable generator of claim 20 wherein said means for axially biasing comprises a spring coupled to said stationary bearing mount.

22. The portable generator of claim 18 further comprising a control circuit including a stationary portion for deriving from said current in said stator excitation winding an AC voltage signal of predetermined frequency for application to said primary transformer winding, and a rotating portion for rectifying a voltage signal induced at across said secondary transformer winding and for supplying said rectified signal to said rotor excitor winding.

23. The portable generator of claim 22 wherein said rotating portion of said control circuit is disposed within an interior cavity of said rotating bearing mount.

24. The portable generator of claim 22 wherein said stationary portion of said control circuit comprises:

a rectifier for rectifying a voltage signal across said stator excitation winding to generate a DC signal; and an inverter for converting said DC signal to a modulated AC signal of predetermined frequency at said transformer primary winding, where said predetermined frequency is higher than said rotational frequency.

25. The portable generator of claim 24 wherein said inverter is a pulse width modulated inverter.

26. The portable generator of claim of 24 further including a sensor for generating a feedback signal indicative of an output voltage across said main stator winding, where said feedback signal is applied to said inverter to control modulation of said AC signal at said transformer primary winding.

27. The portable generator of claim 15 wherein said rotor assembly includes:

a center portion coupled to said engine shaft;

a plurality of poles extending radially from said center portion;

each pole having a plurality of grooves disposed in close proximity to said stator; and said rotor excitor winding comprises a number of turns of conductive material around said poles.

28. The portable generator of claim 15 wherein said rotor assembly is coupled to said engine shaft by a flywheel coupled to said engine shaft and an adapter interposed between said flywheel and said rotor assembly.

29. The portable generator of claim 28 wherein said rotor assembly is threadedly engaged by said adapter.

30. The portable generator of claim 18 further comprising a housing for fixedly coupling said engine and said stator such that said rotor and said stator are in a predetermined spacial relationship, and for coupling said stationary bearing mount in a fixed position relative to said axis of rotation of said transformer and in a movable position relative to the plane normal to said axis of rotation.

* * * * *